(12) United States Patent
Guering

(10) Patent No.: US 7,581,694 B2
(45) Date of Patent: Sep. 1, 2009

(54) VERTICAL TAIL UNIT FOR AIRCRAFT AND AIRCRAFT EQUIPPED WITH SAME

(75) Inventor: Bernard Guering, Montrabe (FR)

(73) Assignee: Airbus France, Toulouse (FR)

( * ) Notice: Subject to any disclaimer, the term of this patent is extended or adjusted under 35 U.S.C. 154(b) by 146 days.

(21) Appl. No.: 11/665,320

(22) PCT Filed: Sep. 23, 2005

(86) PCT No.: PCT/FR2005/050770

§ 371 (c)(1),
(2), (4) Date: Apr. 13, 2007

(87) PCT Pub. No.: WO2006/042982

PCT Pub. Date: Apr. 27, 2006

(65) Prior Publication Data

US 2007/0284477 A1 Dec. 13, 2007

(30) Foreign Application Priority Data

Oct. 15, 2004 (FR) .................................. 04 52348

(51) Int. Cl.
*B64D 33/02* (2006.01)
*B64D 27/00* (2006.01)
(52) U.S. Cl. ...................................... 244/53 B; 244/54

(58) Field of Classification Search .................... 244/54, 244/55, 57, 53 B, 53 R, 62; 137/15.1, 15.2
See application file for complete search history.

(56) References Cited

U.S. PATENT DOCUMENTS

| 2,499,350 | A | * | 3/1950 | Bennett et al. ................. 244/55 |
| 3,666,211 | A | | 5/1972 | Cathers et al. |
| 3,807,665 | A | * | 4/1974 | Coombe ....................... 244/55 |
| 4,456,204 | A | * | 6/1984 | Hapke ........................ 244/53 R |
| 6,113,028 | A | * | 9/2000 | Lohse et al. .................. 244/13 |
| 6,575,406 | B2 | * | 6/2003 | Nelson ....................... 244/119 |

FOREIGN PATENT DOCUMENTS

EP 1 046 577 10/2000

* cited by examiner

*Primary Examiner*—Michael R Mansen
*Assistant Examiner*—Stephen Brookman
(74) *Attorney, Agent, or Firm*—Patterson, Thuente, Skaar & Christensen, P.A.

(57) ABSTRACT

A vertical tail unit for an aircraft and an aircraft equipped with the vertical tail unit. The vertical tail unit is provided with an engine. The engine extends cantilevered beyond a fin of the vertical tail unit and is secured to the fin by a mount. The mount is at least partly attached to the fin. The mount comprises for example half-hoops arranged on either side of the fin.

8 Claims, 2 Drawing Sheets

VERTICAL TAIL UNIT FOR AIRCRAFT AND AIRCRAFT EQUIPPED WITH SAME

RELATED APPLICATIONS

This application claims priority to PCT Application No. PCT/FR2005/050770 filed Sep. 23, 2005, and French Application No. 0452348 filed Oct. 15, 2004 the disclosures of which are hereby incorporated by reference in their entirety.

TECHNICAL FIELD

The invention relates to a vertical tail unit for aircraft. More precisely, the invention relates to a vertical tail unit equipped with an engine as well as an engine and tail unit assembly. The invention finds applications in the field of aeronautics, especially on long-range aircraft designed to transport a large number of passengers.

BACKGROUND ART

Currently, aircraft equipped with at least three engines exist. At least two engines are situated at the underwing section of the aircraft while an additional engine, subsequently called the third engine, is situated at the vertical tail unit of said aircraft.

In the prior art, the presence of this third engine necessitates making a vertical tail unit in two parts. More precisely, a fin of said vertical tail unit is formed in two parts, each part separated from the other by an engine body. A bottom part of the fin, integral with the fuselage, carries the engine. Conversely, a top part of the fin, integral with said engine, is carried by the engine. Therefore continuity of a vertical tail unit body is not assured, since it is interrupted by the presence of the engine. At the location of the engine, it is therefore necessary to dispose frames, or panels, allowing the engine to be integrated to a general contour of the vertical tail unit, and allowing stresses to which the engine/vertical tail unit assembly is subjected to be at least partially taken up.

However, such a solution is difficult to implement. In addition, rigidity of the assembly is less than that of a one-piece vertical tail unit, that is, wherein a body is formed all in one block. Furthermore, assembly of the engine and the vertical tail unit according to the prior art considerably increases the general weight of said vertical tail unit.

SUMMARY OF THE INVENTION

In the invention, making a vertical tail unit equipped with an engine is sought, whose rigidity and weight are not affected by the presence of said engine. Making a vertical tail unit equipped with an engine with easy assembly and possible disassembly is also sought. Therefore, the vertical tail unit may be utilized on aircraft necessitating an additional engine at the location of said vertical tail unit or on aircraft not necessitating the presence of this additional engine on the vertical tail unit.

To do this, the invention proposes using a one-piece vertical tail unit, that is, wherein the continuity of the tail unit body is not interrupted by the presence of a body crossing said tail unit. A mount carrying the engine is mounted around the vertical tail unit, that is, the mount is not a structure in its own right, but uses the tail unit structure. The engine is mounted on the fin of the vertical tail unit through a mount fixed on the fin. The air necessary for operation of the engine crosses an inner volume of the mount to arrive at the engine. A natural aerodynamic profile of the vertical tail unit, more precisely of a leading edge of the vertical tail unit, ensures correct supply of air to the engine.

Therefore, the object of the invention is a vertical tail unit for aircraft, comprising a fin and a flight control surface, said vertical tail unit being equipped with an engine extending in a plane containing the vertical tail unit, Characterized in that the engine extends cantilevered beyond the fin and is integral with said fin by means of a mount, two air flow channels being provided on both sides of the fin, inside the mount, between an inner skin of the mount and an outer wall of said fin.

According to particular examples of embodiment of the invention, the vertical tail unit may also comprise all or part of the following additional characteristics:

- the mount comprises a plurality of half-hoops disposed on both sides of the fin, a radius of curvature of the half hoops following a radius of curvature of the engine body. Plurality is understood to refer to more than two.
- Each half-hoop is integral at the location of a bottom extremity and at the location of a top extremity with a face of the fin.
- The mount is equipped with an outer skin and an inner skin, the half-hoops being disposed in an inner volume provided between the outer and inner skins of the mount.
- The engine is integral with a rear extremity of the mount.
- The mount comprises at least one hoop, said hoop being situated at the location of a front and/or rear extremity of the mount.
- An air intake device extends cantilevered beyond the fin, said air intake device being integral with the front extremity of the mount.
- The air intake device is in one piece and is detachable.

Another object of the invention is an aircraft equipped with such a vertical tail unit.

BRIEF DESCRIPTION OF THE DRAWINGS

The invention will be better understood upon reading the following description and examining the accompanying figures. The figures are presented for indication purposes only and in no way limit the invention. The figures represent.

DETAILED DESCRIPTION OF THE DRAWINGS

Figure 1:
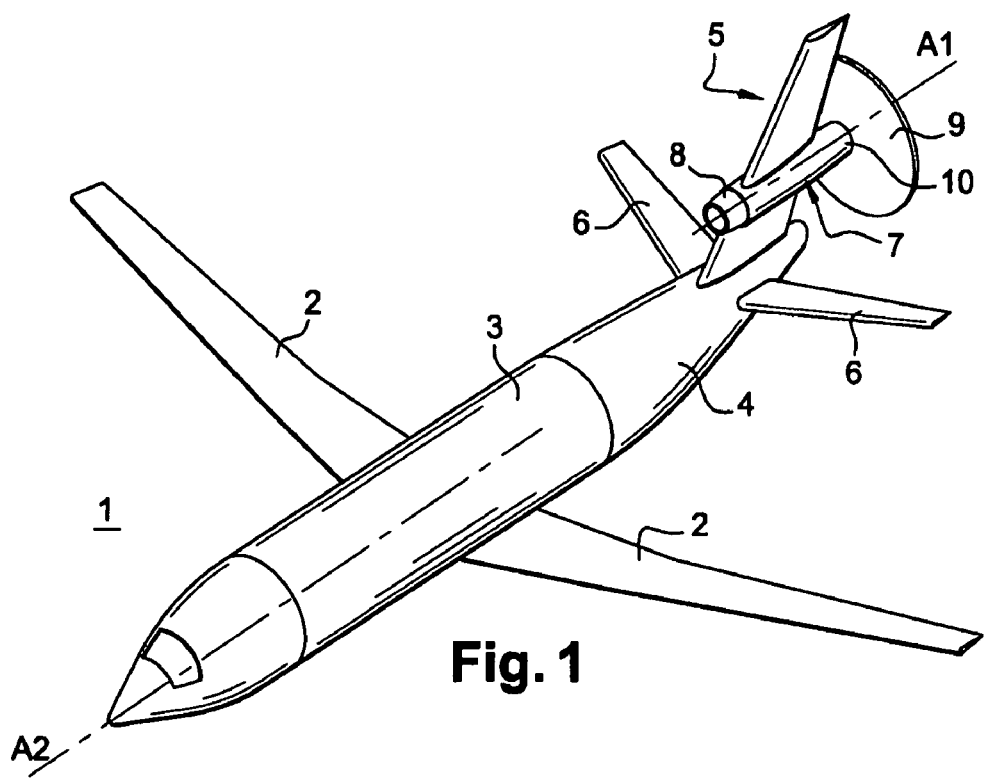
FIG. 1: A general representation of an aircraft according to an example of embodiment of the invention.

FIG. 1 schematically represents an aircraft 1. The engines carried by a wing system 2 of said aircraft 1 are not represented. A vertical tail unit 5 as well as a horizontal tail unit 6 are situated at the location of a rear extremity 4 of fuselage 3 of aircraft 1. The vertical tail unit 5 is equipped with an engine 7. An axis A1 of the engine is parallel to an axis A2 of aircraft 1. Air penetrates in engine 7 by an air intake 8. The air crosses engine 7 up to a rear extremity 10 of said engine 7 carrying a propeller 9. The air escaping from engine 7 at the location of the rear extremity 10 therefore causes the propeller 9 to turn.

Figure 2:
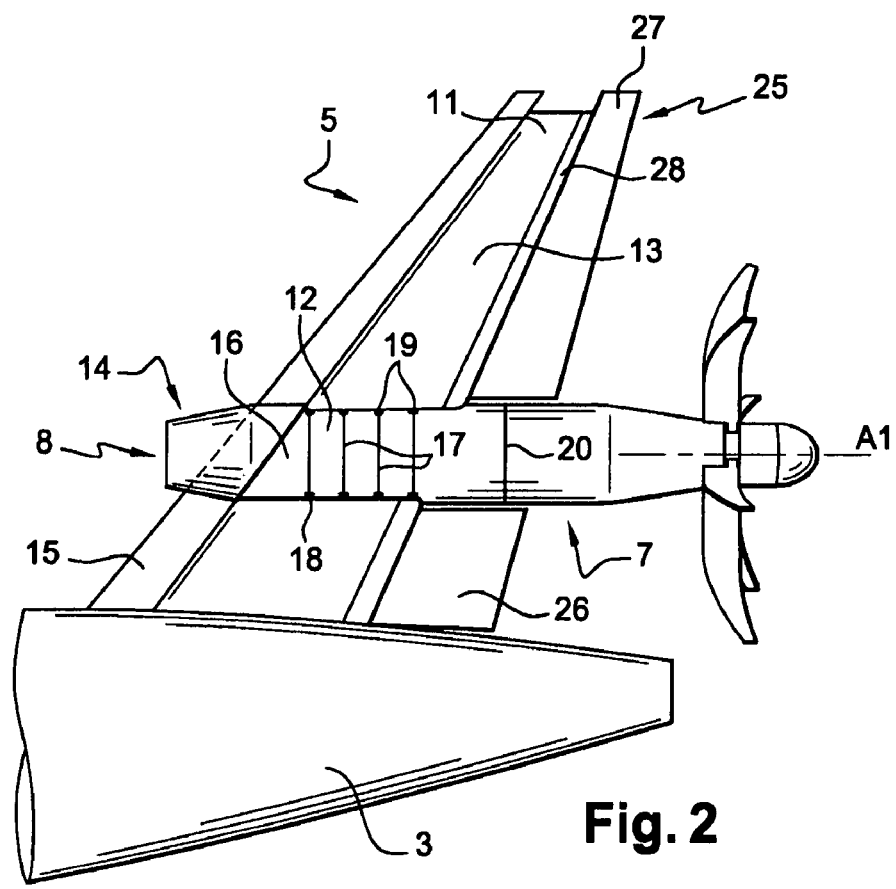
FIG. 2: A side representation of a vertical aircraft equipped with an engine according to an example of embodiment of the invention.

An assembly of the vertical tail unit 5 and the engine 7 is represented in further detail in FIG. 2. The engine 7 is integral with a fin 11 of vertical tail unit 5 through a mount 12. The mount 12 is fixed on a body 13 of the fin 11. The engine 7 is mounted on said mount 12 in such a way as to extend cantilevered on the vertical tail unit 5, in an extension of body 13 of fin 11. An air intake device 14 is integral with a front extremity 16 of mount 12. Said air intake device 14 provides an air intake 8 at the location of a leading edge 15 of the vertical tail unit 5. The air therefore crosses air intake device 14, mount 12 and engine 7.

Front is understood to refer to the part or extremity directed towards an aircraft cockpit. Rear is understood to refer to the part or extremity farthest from said cockpit.

In a particular example of embodiment of mount 12 of the invention, said mount 12 is equipped with a plurality of half-hoops 17, each half-hoop 17 being integral with one of two faces of fin 11. The half-hoops 17 form protuberances on the faces of fin 11. The half-hoops 17, therefore disposed on both sides of fin 11, form a frame for mount 12. The disposition of half-hoops 17 on fin 11 is such that mount 12 has a general circular cylindrical shape. A radius of curvature of the half-hoops 17 follows a radius of curvature of the body of engine 7, also in a general cylindrical shape. The mount 12/engine 7 assembly has a general tube shape.

A first extremity or bottom extremity 18 of half-hoops 17 is integral, by any means, with a face, left or right, of fin 11, while a second extremity or top extremity 19 of said half-hoop 17 is integral with the same face of fin 11, at a higher height. Height is understood to refer to the dimension of the fin 11 that extends perpendicularly to axis A1 of engine 7 (FIG. 1). The half-hoops 17 are, for example, soldered on the faces of fin 11. It is also possible to integrate the half-hoops 17 to the fin 11 by means of nuts and screws.

Mount 12 may also comprise one or more hoops 20 disposed at the extremities of said mount 12. Mount 12 is not integral with fin 11 at the location where the hoop or hoops 20 are situated. The presence of this or these hoops 20 allows the length of mount 12 to be increased. Length of mount 12 is understood to refer to the dimension of the mount extending parallel to axis A1 of engine 7. By increasing the length of mount 12 at the location of a rear extremity of said mount 12, for example, the engine 7 is moved farther apart from vertical tail unit 5. And increasing the length of mount 12 at the location of the front extremity 16 of said mount 12 allows the air intake device 14 to be placed well in front with relation to the vertical tail unit 5.

Figure 3:
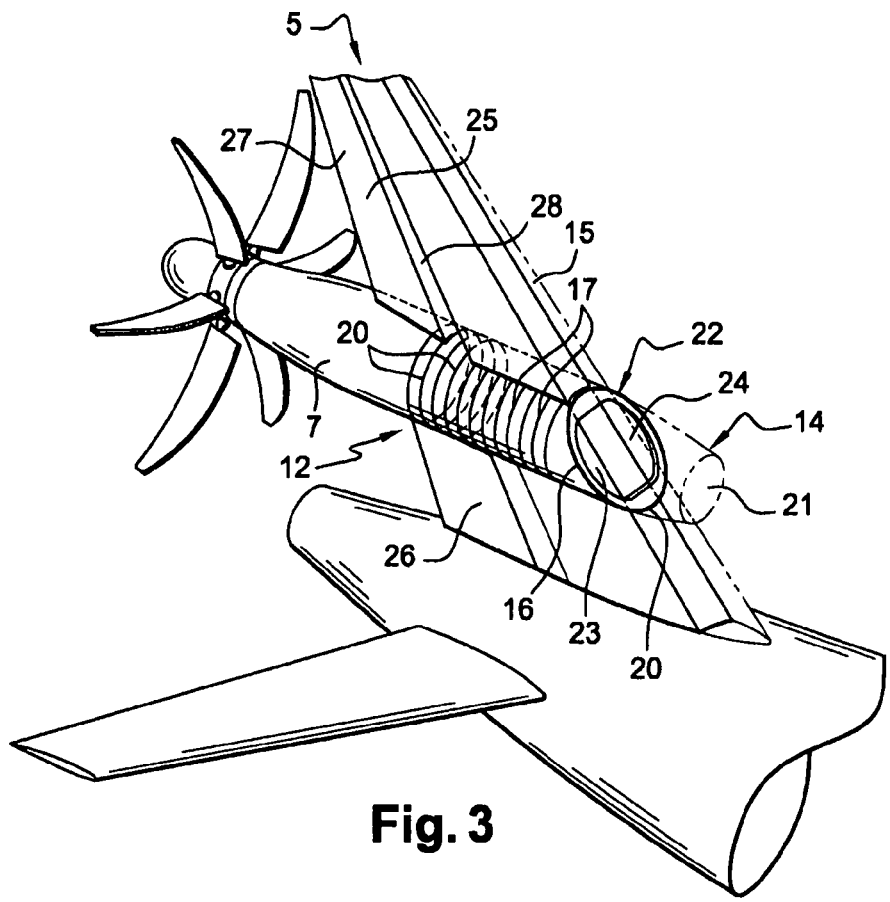
FIG. 3: A schematic representation of an engine assembly on a vertical tail unit according to an example of embodiment of the invention.

In FIG. 3 the air intake device 14 and a trajectory of air entering mount 12 by the air intake device 14 to transit up to engine 7 may be seen in further detail. Two air flow channels 23, 24 are arranged inside mount 12, each channel 23 and 24 bordering an opposite face of fin 11.

The air intake device 14 has a general circular cylindrical shape. A front extremity 21 of the air intake device 14 leads towards the outside, that is, it is an open extremity, in such a way as to allow air to enter. A rear extremity 22 of air intake device 14 is integral with the front extremity 16 of mount 12. For example, the rear extremity 22 of air intake device 14 is fixed to a hoop 20 of mount 12.

The air intake device 14 is a hollow tube, air may circulate from front extremity 21 up to rear extremity 22 of device 14. The presence of the leading edge 15 of the vertical tail unit 5 in an inner volume Vi of the air intake device 14 requires the air transiting into said device 14 to split, to flow inside mount 12 by air flow channels 23 and 24.

A flight control surface 25 of vertical tail unit 6 is formed in two parts, respectively bottom part 26 and top part 27, disposed on both sides of mount 12 and/or engine 7. The flight control surface 25 is mounted mobile on fin 11 through an intermediate part 28, said intermediate part 28 being mounted fixed along fin 11.

Figure 4:
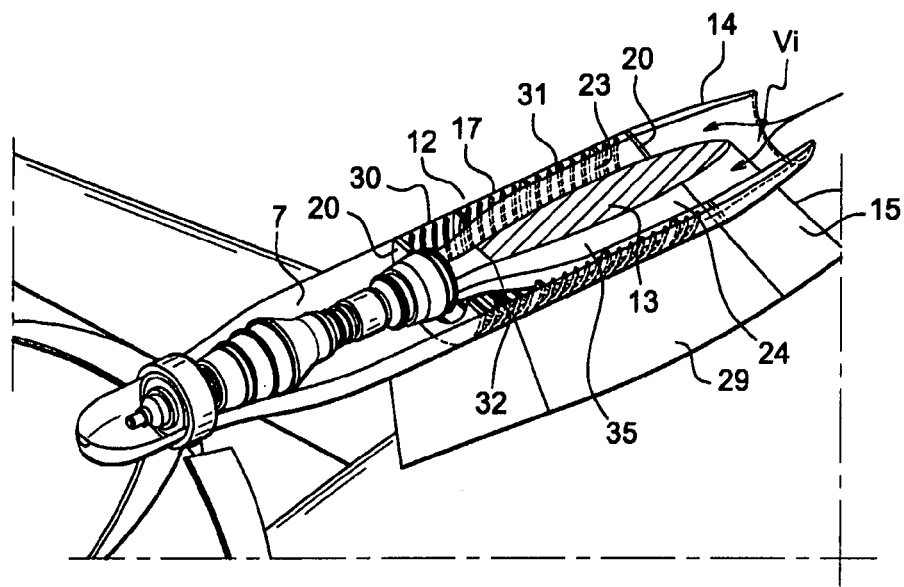
FIG. 4: A transversal section of a vertical tail unit of the invention at the location of a connection between the engine and said vertical tail unit.

FIG. 4 represents, in transversal section, the engine 7/mount 12/air intake device 14 assembly. A lower part 29 of the vertical tail unit 5 may also be seen.

The leading edge 15 of the vertical tail unit 5 crosses the air intake device 14. Mount 12 comprises a plurality of half-hoops 17 disposed on both sides of body 13 of fin 11. In addition, mount 12 comprises two hoops 20 respectively disposed at the location of front extremity 16 and at the location of the rear extremity of said mount 12.

An outer skin 30 of mount 12 surrounds an outer face of half-hoops 17 and hoops 20. An inner skin 31 of mount 12 is situated between the half-hoops 17 and the body 13 of fin 11. Therefore the hoops 20 and the half-hoops 17 are contained in an inner volume 32 provided between the outer skin 30 and the inner skin 31 of mount 12. In FIG. 4, the trajectory of air entering mount 12 may be seen.

Two air flow channels 23 and 24 are provided, in a first part of the vertical tail unit 5 between an inner skin of cover 14 and the outer skin of vertical tail unit 5, and in a second part of the vertical tail unit 5, between the inner skin of mount 12 and an outer wall 35 of fin 11. The air is thus channeled from the air intake device 14 to a turbine of engine 7.

In another example of embodiment of the invention, it may be provided that the half-hoops 17 are not directly integral with the faces of the fin 11. Therefore, the half-hoops 17 intended to be situated on the same face of fin 11 may be integral with a common bar, said common bar itself being fixed to fin 11.

In an example of embodiment of the vertical tail unit 5 of the invention, air intake device 14 may be permanently, that is, irreversibly, integrated with mount 12, for example by soldering. The air intake device 14 may then be formed in two parts, according to the same disposition with relation to the vertical tail unit 5 as that of the half-hoops 17. In fact, the air intake device is crossed, in its length, by leading edge 15 of vertical tail unit 5. Also, forming the air intake device 14 on both sides of the faces of said leading edge may be provided. It is also possible to use a one-piece air intake device 14. It is then possible to provide, on the wall of air intake device 14, a recess that is able to receive a profile of leading edge 15.

In another example of embodiment, it may be provided that air intake device 14, in one piece or not, is mounted in a detachable manner on front extremity 16 of mount 12. The air intake device 14 is then made integral with said mount 12 by any reversible holding means. The reversible holding means are, for example, clips, screws or other means.

The invention claimed is:

1. A vertical tail unit for aircraft, the vertical tail unit comprising a fin presenting a first face and a second opposing face, and a flight control surface, said vertical tail unit being equipped with an engine extending in a plane containing the vertical tail unit, the engine being supported by the vertical tail unit, wherein the engine extends cantilevered beyond at least one of the first face and the second face of the fin and is integral with said fin by a mount operably coupled to the fin such that the fin passes through an interior volume of the mount thereby forming an air flow channel on each side of the fin between an inner skin of the mount and an outer wall of said fin, wherein the mount comprises a plurality of discrete half-hoops disposed on each side of the fin, a radius of curvature of the half-hoops following a radius of curvature of an engine body.

2. The vertical tail unit according to claim 1, wherein each half-hoop is integral with the location of a bottom extremity and with the location of a top extremity of one of said first face and said second face of the fin.

3. The vertical tail unit according to claim 1, wherein the mount is equipped with an outer skin and an inner skin, the half-hoops being disposed in an inner volume provided between the outer and inner skins.

4. The vertical tail unit according to claim 3, wherein the engine is integral with a rear extremity of the mount.

5. The vertical tail unit according to claim 1, wherein the mount comprises at least one hoop, said hoop being situated at a location of at least one of a front extremity and a rear extremity of the mount.

6. The vertical tail unit according to claim 1, wherein an air intake device extends cantilevered beyond the fin, said air intake device being integral with a front extremity of the mount.

7. The vertical tail unit according to claim 6, wherein the air intake device is one-piece and detachable from the front extremity of the mount.

8. An aircraft equipped with a vertical tail unit according to claim 1.

* * * * *